United States Patent [19]

Hancock

[11] Patent Number: 5,342,091
[45] Date of Patent: Aug. 30, 1994

[54] ENERGY ABSORBING STEERING ASSEMBLY

[75] Inventor: Michael T. Hancock, Warwickshire, England

[73] Assignee: The Torrington Company, Torrington, Conn.

[21] Appl. No.: 73,214

[22] Filed: Jun. 7, 1993

[30] Foreign Application Priority Data

Jul. 29, 1992 [GB] United Kingdom ............... 9215995
Sep. 18, 1992 [GB] United Kingdom ............... 9219760

[51] Int. Cl.$^5$ ............................................. B62D 1/11
[52] U.S. Cl. ..................................... 280/777; 180/78; 74/492
[58] Field of Search ................... 280/777; 180/78; 74/492

[56] References Cited

U.S. PATENT DOCUMENTS

| | | | |
|---|---|---|---|
| 3,392,599 | 7/1968 | White | 280/777 |
| 3,461,740 | 8/1969 | Tajima et al. | 280/777 |
| 3,851,542 | 12/1974 | Adams et al. | 74/492 |
| 4,098,141 | 7/1978 | Yamaguchi | 74/492 |

FOREIGN PATENT DOCUMENTS 1075329  7/1967  United Kingdom .

*Primary Examiner*—Kenneth R. Rice
*Attorney, Agent, or Firm*—Michael H. Minns

[57] ABSTRACT

A vehicle crash energy absorbing mechanism incorporated in a steering column structure mountable to a breakaway mounting, the structure including an inner steering shaft which is drivably coupled by a splined arrangement to an outer shaft. The inner shaft has an energy absorption member in the form of a tube which surrounds a pin which is mounted diametrically through the inner shaft. A crash induced force on the column structure causes the outer shaft to be forced relatively towards the tube, thereby inducing an interaction between the pin and tube, the latter being deformed thereby to achieve the requisite energy absorption. In an alternative embodiment, the splined outer shaft itself acts as the absorption energy member, the pin deforming the splined arrangement.

10 Claims, 4 Drawing Sheets

ENERGY ABSORBING STEERING ASSEMBLY

BACKGROUND OF THE INVENTION

This invention relates generally to a steering assembly for a vehicle and more particularly to an energy absorbing steering assembly for protecting a driver which is collapsible and absorbs the energy when a vehicle impacts on an obstacle.

During a crash a suitable mechanism is required to meet statutory regulations in respect of the force imposed on a driver of a vehicle when in contact with the vehicle's steering wheel. There are various mechanisms for this purpose, however these mechanisms require expensive manufacturing costs.

The foregoing illustrates limitations known to exist in present energy absorbing steering assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an energy absorbing assembly comprising: a steering column structure mountable to a breakaway mounting, the steering column structure including an inner steering shaft and an outer shaft drivably coupled to the inner steering shaft and axially slidable with respect to the inner steering shaft; and an energy absorbing means for absorbing energy from crash induced forces on the steering column structure, the energy absorbing means being mounted on the inner steering shaft, the energy absorbing means comprising: a tube mounted about the inner steering shaft and a pin extending outward of the inner steering shaft, the pin having a length as to form an interference fit within an initial part of the tube.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

A vehicle crash energy absorbing mechanism according to one aspect of the present invention comprises a steering column structure mountable to a breakaway mounting, the structure including an inner steering shaft and an outer shaft drivably coupled to the inner shaft and axially slidable over and with respect to the inner shaft, the inner shaft having an energy absorption member mounted thereon by means of a pin, the mechanism acting so that a crash induced force on the column structure causes the outer shaft to be forced relatively towards the energy absorption member inducing an interaction between the pin and member.

Preferably the pin is mounted diametrically through the inner shaft. The absorption member can comprise a tube. The pin is preferably of such a length as to form an interference fit within at least an initial part of the tube. This initial part may have diametrically opposite slots extending in the axial direction some 10 mm or so from the outer end of the tube.

According to another aspect of the present invention, there is provided a vehicle crash energy absorbing mechanism comprising a steering column structure mountable to a breakaway mounting, the structure including an inner steering shaft and an outer shaft drivably coupled to the inner shaft and axially slidable over and with respect to the inner shaft, the inner shaft having a pin incorporated therein, the mechanism acting so that a crash induced force on the column structure causes the outer shaft to be forced relatively towards the pin thereby inducing an interaction between the pin and outer shaft, the latter acting as an energy absorption member.

An advantage of this mechanism is the low cost and the ease with which it can be adapted to meet particular vehicle requirements.

The pin diameter and/or length, tube thickness and interference can be varied. A further advantage is that at the point of manufacture the mechanism as assembled can be completely checked by measuring the installed force of inserting the pin into the mouth of the tube.

Further embodiments and variation may be constructed having more than one cross pin.

Figure 1:
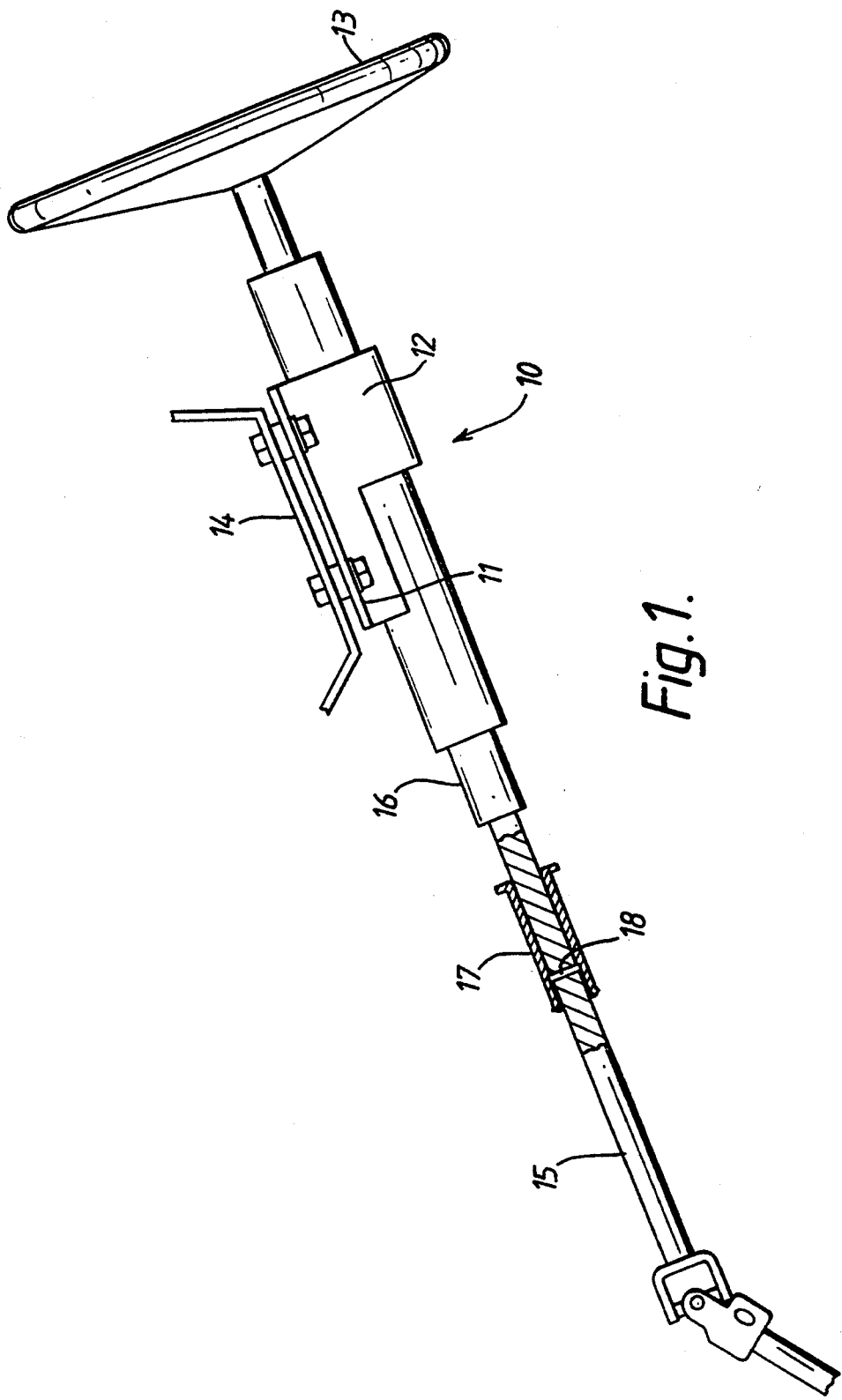
FIG. 1 is a general elevation of a steering column structure having one form of an energy absorbing mechanism.
Figure 2:
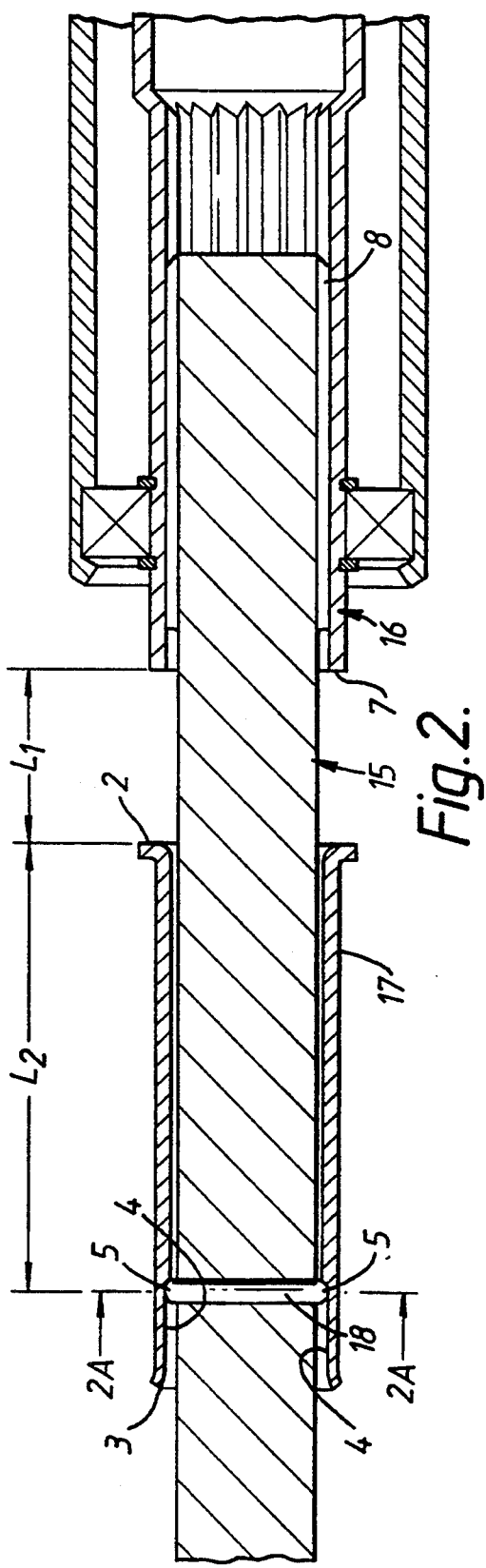
FIG. 2 is an enlarged axial cross-section of the mechanism of FIG. 1.
Figure 2A:
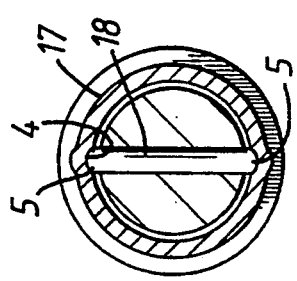
FIG. 2A is a diametral cross-section taken at 2A—2A on FIG. 2 showing pin and tube construction.

In FIG. 1 there is shown a steering column structure 10 with steering wheel 13 and mounting bracket 12 connected by breakaway capsules 11 to cross member 14. The steering column structure 10 having an inner steering shaft 15 which is mounted by means of a spline 8 to an outer steering column shaft 16, so that the outer shaft can move axially over and with respect to the inner shaft 15.

Mounted around the inner steering shaft 15 is a tubular energy absorption member 17 having an inner abutment flange shaped portion 2 and an outer mouth 3 within which and extending inwards from the outer extremity of the mouth are two axially aligned grooves 4 which are diametrically opposed and which receive, by means of an interference fit, the ends 5 of a cross pin 18.

When a crash occurs, impact by the driver on steering wheel 13 forces bracket 12 to breakaway from cross member 14. The outer end 7 of the outer tube 16 then moves relatively a distance $L_1$ to impact on abutment portion 2 of member 17. The movement of the cross pin 18 along length $L_2$ within member 17 under controlled interference achieves the requisite energy absorption.

Figure 3:
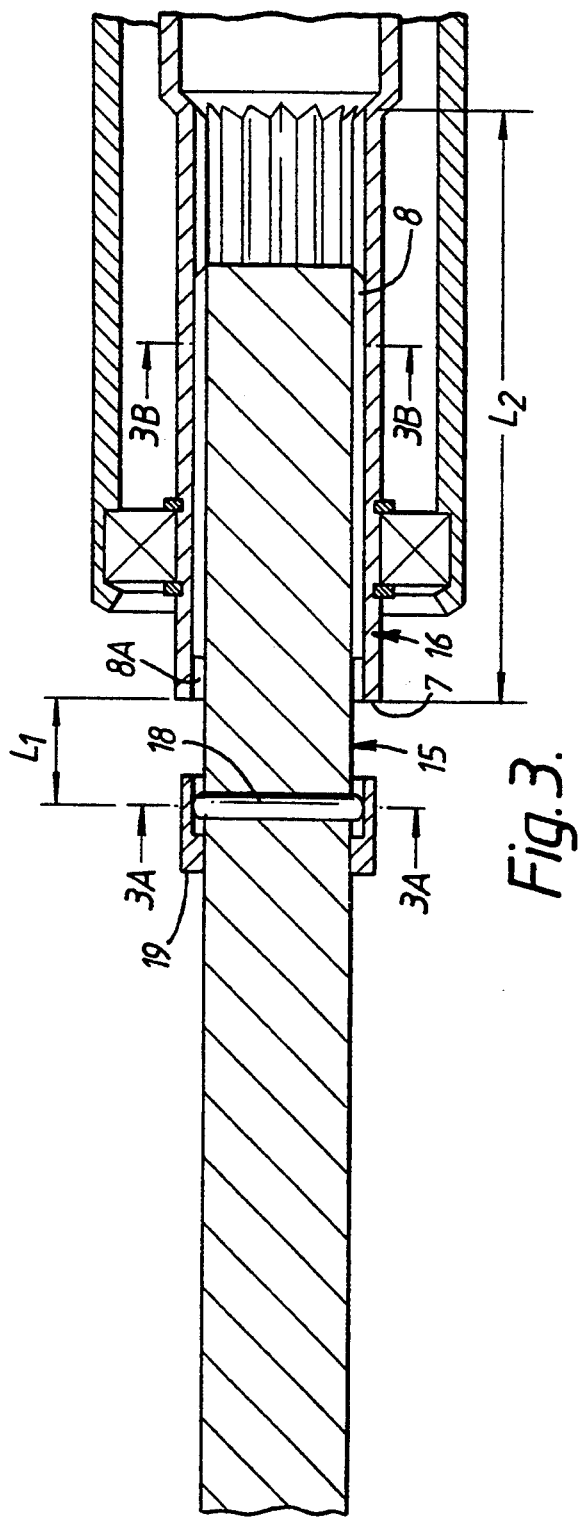
FIG. 3 is a view similar to FIG. 2 of another form of the energy absorbing mechanism.
Figure 3B:
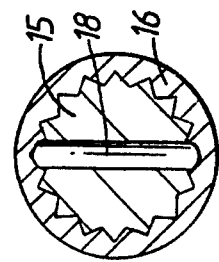
FIG. 3B is a diametral cross-section taken at imaginary line 3B—3B in FIG. 3 illustrating deformation by pin after crash movement of steering column.
Figure 3A:
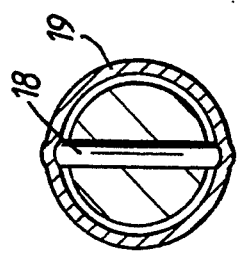
FIG. 3A is a diametral cross-section taken at 3A—3A on FIG. 3 showing pin and sleeve construction.

With the modification illustrated in FIGS. 3, 3A and 3B, the tubular energy absorption member 17 is replaced by the splined outer steering column shaft 16 itself. In this case, the pin 18 is held in place in the inner shaft 15 by a sleeve 19, which is located as an interference fit about the inner shaft 15.

The end of the spline 8 adjacent the end 7 of the outer tube 16 is given a chamfered entry 8A. When a crash occurs, the outer end 7 of the outer tube 16 is moved the distance $L_1$, which is free travel to impact on the facing end of the sleeve 19, which is pushed clear of the cross pin 18. The chamfered entry 8A of the spline 8 receives the opposite ends of the cross pin 18, which then proceed to deform the spline 8 in the outer tube 16, the energy being absorbed over length $L_2$ (see FIGS. 3 and 3B).

Figure 4:
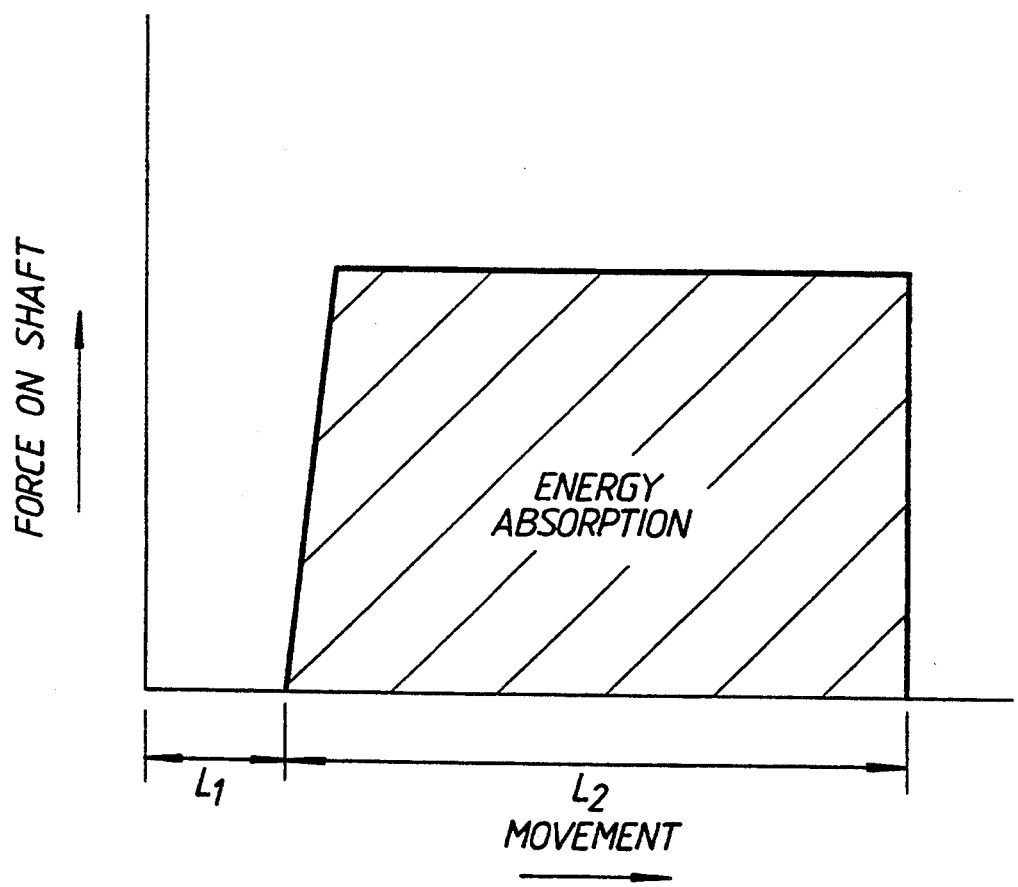
FIG. 4 is a diagram of the force on the steering column shaft against movement of the tube relative the outer shaft shown in FIG. 1.

The absorption energy is shown graphically in FIG. 4.

In the preferred embodiment, the cross pin 18 is free floating, i.e. a loose fit, within the inner shaft 15. In particular, for the embodiment shown in FIGS. 3, 3A and 3B, if the cross pin 18 is not exactly lined up with one of the splined grooves in the spline 8, the cross pin 18 can move slightly to align with the groove.

Having described the invention, what is claimed is:

1. An energy absorbing assembly comprising:
   a steering column structure mountable to a breakaway mounting, the steering column structure including an inner steering shaft and an outer shaft drivably coupled to the inner steering shaft and axially slidable with respect to the inner steering shaft; and
   an energy absorbing means for absorbing energy from crash induced forces on the steering column structure, the energy absorbing means being mounted on the inner steering shaft, the energy absorbing means comprising: a tube mounted about the inner steering shaft and a pin extending outward of the inner steering shaft, the pin having a length as to form an interference fit within an initial part of the tube, the pin being free floating within the inner steering shaft.

2. The energy absorbing assembly according to claim 1, wherein said initial part of the tube having diametrically opposite slots extending in the axial direction from the outer end of the tube.

3. The energy absorbing assembly according to claim 1, wherein the inner steering shaft and the outer shaft are drivably coupled to one another by a splined arrangement.

4. The energy absorbing assembly according to claim 1, wherein the pin is mounted diametrically through the inner steering shaft.

5. An energy absorbing assembly comprising:
   a steering column structure mountable to a breakaway mounting, the steering column structure including an inner steering shaft and an outer shaft drivably coupled to the inner shaft by a splined arrangement and axially slidable with respect to the inner steering shaft, the inner steering shaft having an outwardly extending pin therein, the inner steering shaft being forced into the outer shaft in a crash situation, the pin deforming said splined arrangement thereby absorbing energy.

6. The energy absorbing mechanism according to claim 5, further comprising:
   a sleeve about the inner steering shaft, the pin being held in place by the sleeve, the sleeve being urged clear of the pin by said outer shaft when it is forced towards the pin.

7. The energy absorbing assembly according to claim 5, wherein the pin is mounted diametrically through the inner steering shaft.

8. The energy absorbing assembly according to claim 5, wherein the pin is free floating within the inner steering shaft.

9. A steering column energy absorbing mechanism for a vehicle comprising:
   a steering column structure attached to the vehicle by a breakaway mounting;
   the steering column structure including: an outer tubular steering shaft and an inner steering shaft drivably coupled to the outer tubular steering shaft by a splined arrangement, the inner steering shaft being axially slidable relative to the outer tubular steering shaft;
   a tubular energy absorption member mounted about the inner steering shaft, the tubular energy absorption member having a first end and a second end and a pair of diametrically opposed grooves on its inner surface, said grooves extending from said first end partway towards said second end; and
   a cross pin extending through the inner steering shaft, the cross pins engaging said grooves, the cross pin being free floating within the inner steering shaft, the tubular energy absorption mechanism being forced by the outer tubular steering shaft relative to said pin in a crash situation, the pin deforming the tubular energy absorption member.

10. The steering column energy absorbing mechanism according to claim 9, wherein a length of free travel is provided for the outer tubular steering shaft prior to the tubular energy absorption member being encountered.

* * * * *